United States Patent [19]

Sauter

[11] 3,926,970
[45] Dec. 16, 1975

[54] MEROCARBOCYANINE FILTER DYES

[75] Inventor: Frederick J. Sauter, Rochester, N.Y.

[73] Assignee: Eastman Kodak Company, Rochester, N.Y.

[22] Filed: May 7, 1973

[21] Appl. No.: 357,961

Related U.S. Application Data

[62] Division of Ser. No. 266,028, June 26, 1972, Pat. No. 3,840,375.

[52] U.S. Cl............. 260/240.4; 96/84 R; 117/33.3; 252/300
[51] Int. Cl.$^2$......................................... C09D 23/10
[58] Field of Search.......... 260/240 E, 240 R, 240.4

[56] References Cited
UNITED STATES PATENTS 3,681,081   8/1972   Jenkins et al................ 260/240.4 X

*Primary Examiner*—John D. Randolph
*Attorney, Agent, or Firm*—M. R. Chipaloski

[57] ABSTRACT

There are disclosed merocarbocyanine filter dyes of the formula

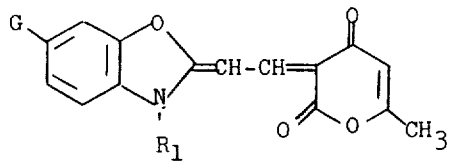

These dyes are characterized by a rapid rate of bleaching in sulfite solutions of the type conventionally used in photographic developing solutions.

10 Claims, No Drawings

MEROCARBOCYANINE FILTER DYES

This is a division of application Ser. No. 266,028, filed June 26, 1972, now U.S. Pat. No. 3,840,375 granted Oct. 8, 1974.

This invention relates to photographic filter dyes having accelerated rates of bleaching. This invention also relates to photographic elements comprising a support having thereon at least one layer containing such filter dyes.

It is known that photographic elements require for many purposes to have light-screening substances incorporated therein. In particular, light-screening substances are often required (a) in overcoatings upon photographic elements to protect the light sensitive emulsion or emulsions from the action of light which it is not desired to record, (b) in layers arranged between differentially colored sensitized emulsions, e.g., to protect red- and green-sensitive emulsions from the action of blue light, and (c) in backings forming the so-called antihalation layers on either side of a transparent support carrying the light-sensitive emulsions or emulsions. Filter dyes used in such layers must be bleachable by treating solutions used during processing with no adverse effects upon the development of the film.

In accordance with this invention, there is provided a new class of merocarboycanine filter dyes possessing accelerated rates of bleaching having the general formula

I.

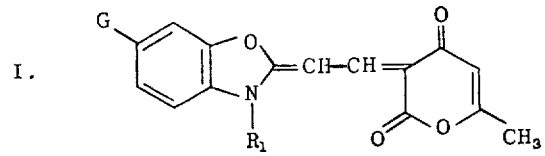

wherein $R_1$ represents a lower alkyl group having one to eight carbon atoms such as methyl, ethyl, propyl, butyl, etc., and including substituted lower alkyl groups such as a carboxyalkyl group (e.g., carboxymethyl, carboxyethyl, carboxypropyl, carboxybutyl, etc.), a alkoxycarbonylalkyl group (e.g., methoxycarbonylmethyl, ethoxycarbonylethyl, propoxycarbonylethyl, propoxycarbonylbutyl, etc.), a sulfoalkyl group (e.g., sulfomethyl, sulfoethyl, sulfopropyl, sulfobutyl, etc.), a hydroxyalkyl group (e.g., hydroxymethyl, hydroxyethyl, hydroxypropyl, hydroxybutyl, etc.), an alkoxyalkyl group (e.g., methoxyethyl, methoxypropyl, ethoxyethyl, ethoxypropyl, etc.), a sulfoalkoxyalkyl group; an aryl group such as phenyl, 4-methylphenyl, 4-chlorophenyl, etc.; or an electron withdrawing group (e.g., a cyanoalkyl group or an acylalkyl group) and G represents a hydrogen atom or an electron withdrawing group such as a sulfamoyl group (e.g., the group $R_2CONHSO_2-$ or $R_3NHSO_2-$ wherein $R_2$ and $R_3$ each represents a lower alkyl group or aryl group as previously defined for $R_1$, at least one of the groups $R_1$ and G being an electron withdrawing group.

The merocarbocyanine dyes of this invention may be prepared by heating a mixture of a quaternary ammonium salt having the formula

II.

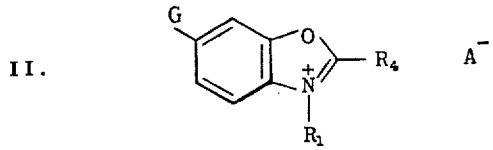

wherein $R_1$ and G are as previously defined, $R_4$ represents a 2-anilinovinyl group or a 2-acetanilidovinyl group, and A is an anionic group such as chloride, bromide, iodide, p-toluenesulfonate, thiocyanate, perchlorate, acetate, methylsulfate, ethylsulfate, etc., with 6-methyl-2H-pyran-2,4(3H)-dione. The reaction may be carried out in the presence of an inert solvent such as pyridine, quinoline, isoquinoline, ethanol, n-propanol, n-butanol, etc. and in the presence of a basic condensing agent such as the trialkyl amines (e.g., triethylamine, tri-n-propylamine, tri-n-butylamine, etc.), N-methylpiperidine, N-ethylpiperidine, N,N-dimethylaniline, etc.

The quaternary ammonium salts of Formula II wherein G is a sulfamoyl group may be prepared by reacting 2-methyl-6-chlorosulfonylbenzoxazole with an appropriate amine to form a 6-sulfamoyl derivative, thereafter preparing the quaternary salt and then converting the 2-methyl group to a 2-anilinovinyl group or 2-acetanilidovinyl group by known methods. The following examples illustrate the preparation of some quaternary ammonium salts of Formula II wherein G is the electron withdrawing group:

EXAMPLE A

A mixture of 2-methylbenzoxazole (100 g.) and chlorosulfonic acid (350 ml.) is heated to a temperature of 145°–150°C. in an oil bath for 1¾ hours. The mixture is then cooled and quenched on 2 kg. of crushed ice. The resultant precipitated solid is dissolved in ether, filtered, dried and concentrated to give 121 g. (70% yield) of crude 6-chlorosulfonyl-2-methylbenzoxazole having the formula

III.

This product (16.2 g.) is added with stirring to a mixture of 150 ml. of diethyl ether and 50 ml. of concentrated aqueous ammonia. The resultant precipitated solid is filtered off and recrystallized from ethanol (250 ml.) to afford 5.9 g. (42% yield) of crystalline 2-methyl-6-sulfamoylbenzoxazole having the formula

IV.

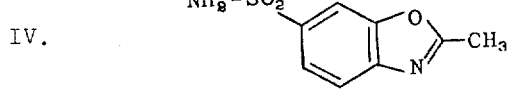

The product IV has a melting point of 207°–210.5°C.

EXAMPLE B

A portion of III is treated with 2 equivalents of aniline and the resultant product, 2-methyl-6-(N-phenylsulfamoyl)-benzoxazole is washed with water and dried. It has a melting point of 220°–227°C. Heating this with methyl-p-toluenesulfonate on a steam bath for 2 hours results in a quaternary salt having the formula V. It is precipitated by the addition of V. 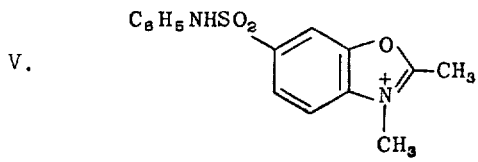   

diethyl ether to the reaction mixture and is obtained in 45% yield with a melting point above 250°C. It is heated with diphenylformamidine to form 2-(2-anilinovinyl)-3-methyl-6-N-phenylsulfamoylbenzoxazolium p-toluenesulfonate.

EXAMPLE C

The procedure of Example B is repeated except that ethylamine is substituted for the aniline to obtain 2-methyl-6-(N-ethylsulfamoyl)benzoxazole, having a melting point of 97°–98°C., which after heating with methyl-p-toluenesulfonate yields the quaternary salt VI VI. 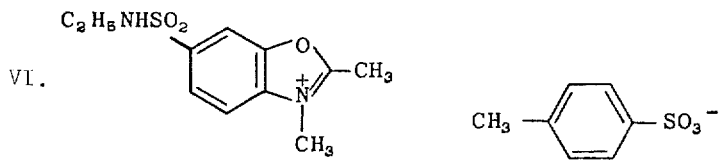

in 33% yield having a melting point of 190°C. It is heated with diphenylformamidine to form 2-(2-anilinovinyl)-3-methyl-6-N-ethylsulfamoylbenzoxazolium p-toluenesulfonate.

EXAMPLE D

To a suspension of 2,3-dimethyl-6-sulfamoylbenzoxazolium-p-toluenesulfonate (2.0 g., 5 m. mole) in 10 ml. of acetic anhydride is added diphenylformamidine (1.0 g., 5 m. mole) and the reaction mixture is heated with stirring near reflux until all material has dissolved. Sodium iodide (2 g.) is then added and the solution stirred for 30 seconds, cooled and filtered. The filtrate is precipitated by the addition of diethyl ether to obtain a hygroscopic solid, 2.1 g. (75% yield), 2-(2-acetanilidovinyl)-6-acetylsulfamoyl-3-methylbenzoxazolium iodide, having the formula VII.

VII. 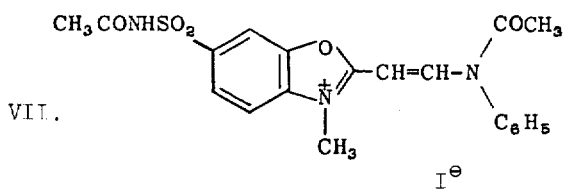

EXAMPLE E 2-(2-Acetanilidovinyl)-3-(2-cyanoethyl)benzothiazolium bromide

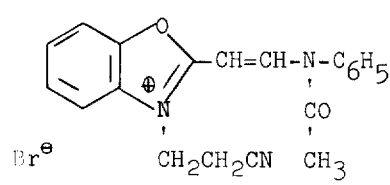

To a solution of N,N'-diphenylformamidine (2.20 g., 1.1 mmoles) in 7 ml. acetic anhydride is added 3-(2-cyanoethyl)-2-methylbenzoxazolium bromide (2.45 g., 0.92 mmoles), and the mixture was heated with stirring to 100°C. until all the solid material had dissolved. The reaction mixture was cooled, and the product was precipitated by the addition of diethyl ether. After stirring 16 hours under diethyl ether, the solid product was collected by filtration and dried. The yield was 2.0 g.

The merocarbocyanine filter dyes of this invention are more rapidly bleached in buffered alkaline sulfite solutions of the type conventionally used in photographic developing solutions than analogous compounds which do not contain electron withdrawing groups. For example, dyes of Formula I wherein $R_1$ is a cyanoethyl group or a phenacyl group are more rapidly bleached than are the corresponding N-sulfoalkyl or N-ethyl substituted dyes. The dyes of Formula I wherein $R_1$ is a cyanoethyl group are bleached up to 27 times faster than analogous compounds wherein $R_1$ is a sulfopropyl group.

The merocarbocyanine filter dyes can be incorporated into various layers of the photographic element by methods well known in the art, e.g., by coating on a photographic base a water solution of the dye and a hydrophilic colloid binder. Hydrophilic colloids which can be used as vehicles for the present dyes are those known to be satisfactory vehicles for use in making photographic elements and include emulsions comprising both naturally occurring substances such as proteins, for example, gelatin, gelatin derivatives, cellulose derivatives, polysaccharides such as dextran, gum arabic and the like; and synthetic polymeric substances such as water soluble polyvinyl compounds like poly(vinylpyrrolidone), acrylamide polymers and the like. The proportions of dye and colloid binders may be varied over wide ranges and will depend upon the specific requirements of the photographic element being produced. The method used to determine the optimum composition is well known in the art.

Light sensitive layer or layers and the filter dye layer of the invention can be coated on any suitable support. Typical supports include cellulose nitrate film, cellulose acetate film, poly(vinyl acetal) film, polystyrene film, poly(ethylene terephthalate) film, polycarbonate film and related films or resinous materials, as well as glass, paper, metal and the like. Typically, a flexible support is employed, especially a paper support, which can be partially acetylated or coated with baryta and/or an alpha-olefin polymer, particularly a polymer of an alpha-olefin containing two to 10 carbon atoms such as polyethylene, polypropylene, ethylenebutene copolymers and the like.

The photographic elements utilizing the present merocarbocyanine filter dye layers can have light-sensitive silver halide emulsion layers containing, for example, silver chloride, silver bromide, silver bromoiodide, silver chlorobromide, silver chloroiodide, silver chlorobromoiodide crystals or mixtures thereof. The emulsions can be coarse or fine grain emulsions and can be prepared by a variety of techniques, e.g., single jet emulsions such as those described in Trivelli and Smith, *The Photographic Journal*, Vol. LXXIX, May 1939 (pp. 330-338), double jet emulsions such as Lippmann emulsions, ammoniacal emulsions, thiocyanate or thioether ripened emulsions such as those described in Neitz et al U.S. Pat. No. 2,222,264, issued Nov. 19, 1940; Illingsworth U.S. Pat. No. 3,320,069 issued May 17, 1967 and McBride U.S. Pat. No. 3,271,157 issued Sept. 6, 1966. Conventional silver halide emulsion addenda can be added to such emulsions and include those disclosed in *Product Licensing Index*, Vol. 92, December 1971, publication 9232, pages 107-109, particularly paragraphs III-VII, XI-XII and XV.

The following examples further illustrate the invention.

EXAMPLE 1.

3-{[3-(2-Cyanoethyl)benzoxazolinylidene]ethylidene}-6-methyl-2H-pyran-2,4(3H)-dione

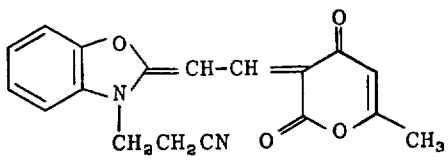

2-(2-Acetanilidovinyl)-3-(2-cyanoethyl)-benzoxazolium bromide (0.40 g., 1.00 m. mole), acetic anhydride (0.5 ml.) and 6-methyl-2H-pyran-2,4(3H)dione (0.14 g., 1.11 m. mole) are stirred in 3 ml. of dimethylformamide. Triethylamine (0.3 ml.) is then added and the reaction is stirred until no further product crystallizes out. The crude dye, 0.25 g., is collected, washed with acetonitrile and recrystallized twice from ethanol (400 ml. of ethanol per g. of product) to yield 0.18 g. of dye. The product has a melting point of 253°C., a $\lambda_{max}$ in methanol of 451 nm. and a bleach rate of 2.7 $k_2Mols^{-1}$ sec.$^{-1}$.

EXAMPLE 2

6-Methyl-3-[(3-phenacyl-2-benzoxazolinylidene)-ethylidene]-2H-pyran-2,4(3H)-dione

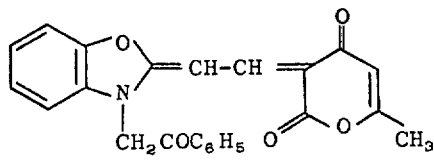

This product is obtained by the process of Example 1 substituting 2-(2-anilinovinyl)-3-phenacylbenzoxazolium bromide for the 2-(2-anilinovinyl)-3-(2-cyanoethyl)-benzoxazolium bromide and using a mixture of acetonitrile and ethanol as the reaction solvent instead of dimethylformamide. The product has a melting point of 251°C., a $\lambda_{max}$ in a mixture of methanol and pyridine of 452 nm. and a bleach rate of 3.4 $k_2Mols^{-1}$ sec.$^{-1}$.

EXAMPLE 3

3-[(6-acetylsulfamoyl-3-methyl-2-benzoxazolinylidene)-ethylidene]-6-methyl-2H-pyran-2,4(3H)-dione

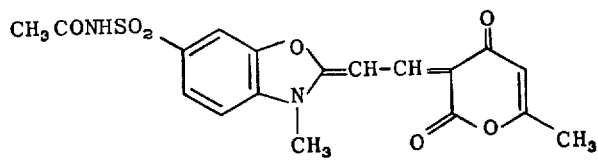

This product is obtained by the process of Example 1 substituting 2-(2-anilinovinyl)-3-methyl-6-acetylsulfamoylbenzoxazolium bromide for the 2-(2-anilinovinyl)-3-(2-cyanoethyl)-benzoxazolium bromide and using acetonitrile as the reaction solvent instead of dimethylformamide. The product has a melting point of 260°C. with decomposition, a $\lambda_{max}$ in a mixture of methanol and pyridine of 456 nm. and a bleach rate of 4.7 $k_2Mols^{-1}$ sec.$^{-1}$.

EXAMPLE 4

3-[(6-N-phenylsulfamoyl-3-methyl-2-benzoxazolinylidene)ethylidene]-2H-pyran-2,4(3H)-dione.

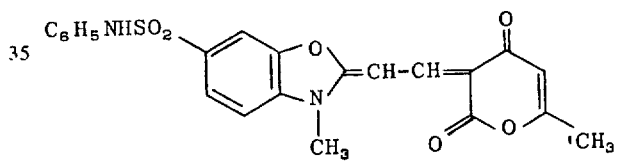

This product is obtained by the process of Example 1 substituting 2-(2-anilinovinyl)-3-methyl-6-N-phenylsulfamoylbenzoxazolium bromide for the 2-(2-anilinovinyl)-3-(2-cyanoethyl)-benzoxazolium bromide and using ethanol as the reaction solvent instead of dimethylformamide and pyridine as the recrystallization solvent instead of ethanol. The product has a melting point above 260°C., a $\lambda_{max}$ in a mixture of methanol and pyridine of 457 nm. and a bleach rate of 2.4 $k_2Mol^{-1}$ sec.$^{-1}$.

EXAMPLE 5

3-[(6-N-Ethylsulfamoyl-3-methyl-2-benzoxazolinylidene)ethylidene]-6-methyl-2H-pyran-2,4(3H)-dione

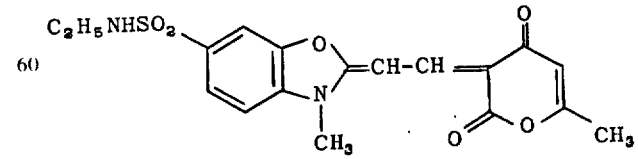

This product is obtained by the process of Example 1 substituting 2-(2-anilinovinyl)-3-methyl-6-N-ethylsulfamoylbenzoxazolium bromide for the 2-(2- anilinovinyl)-3-(2-cyanoethyl)-benzoxazolium bromide and using a mixture of cresol and ethanol as the recrystallization solvent instead of ethanol. The product has a melting point above 280°C., a $\lambda_{max}$ in a mixture of cresol and methanol of 455 nm. and a bleach rate of 18.0 k₂Mols⁻¹ sec.⁻¹.

EXAMPLE 6

The dyes of Examples 1, 3, 4 and 5 dissolved in suitable solvents, are added to separate portions of an aqueous gelatin solution containing saponin as a spreading agent. The dyes of Examples 1, 2, 4 and 5 are dissolved in a mixture of N-methylpyrrolidone and acetone and the dye of Example 3 is dissolved in a mixture of methanol and triethylamine. Each solution is coated at a coverage of about 10 mg. of dye per square foot and about 800 mg. of gelatin per square foot on a cellulose acetate photographic film support and the coatings are dried. The optical densities of the coatings are measured spectrophotometrically, fresh (before soaking in water), after soaking for 5 minutes in water, after soaking for 5 minutes in water and 3 minutes in Kodak D-19 developer, and after soaking for 5 minutes in water, 3 minutes in Kodak D-19 developer and 5 minutes in Kodak F-5 fixer, and the results are recorded in the Table. The column headed "After Inc." records the optical density of untreated coating after incubation at 120°C. for 7 days. The values in the column headed "% After Inc." are determined by dividing the value for "After Inc." by the value for "Fresh."

and G represents hydrogen or a sulfamoyl group, with at least one of the groups $R_1$ and G being a cyanoalkyl, acylalkyl, or sulfamoyl group.

2. A merocyanine filter dye selected from those having the formula

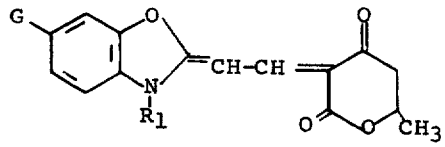

wherein G represents hydrogen and $R_1$ is a cyanoalkyl or acylalkyl group.

3. A merocyanine filter dye selected from those having the formula

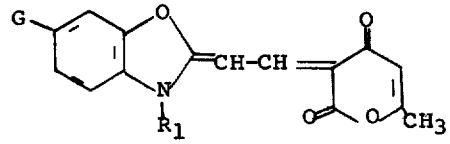

wherein $R_1$ represents a lower alkyl, phenyl, methylphenyl, or chlorophenyl group and G represents a sulfamoyl group.

4. The merocarbocyanine filter dye 3-{[3-(2-cyanoethyl)benzoxazolinylidene]ethylidene}-6-2H-pyran-2,4(3H)-dione.

TABLE

| | | Optical Density at $\lambda_{max}$ | | | | | |
|---|---|---|---|---|---|---|---|
| Dye of Example | $\lambda_{max}$ (nm) | Fresh | After Soaking 5 Min. in Water | After Soaking 5 Min. in Water and 3 Min. in Developer | After Soaking 5 Min. in Water, 3 Min. in Developer and 5 Min. in Fixer | After Inc. | % After Inc. |
| 1 | 459 | 0.26 | 0.22 | 0.22 | 0.22 | 0.25 | 96 |
| 3 | 460 | 0.78 | 0.06 | 0.08 | 0.05 | 0.10** | 13 |
|   | 430 | 0.90 | 0.05 | 0.07 | 0.05 |  |  |
| 4 | 462 | 0.46 | 0.35 | 0.29 | 0.26 | 0.28 | 61 |
| 5 | 463 | 0.36 | 0.21 | 0.21 | 0.18 | 0.20 | 56 |

*dye decomposed
**peak at 350nm

As used herein the empirical formulas —C₂H₅ and —C₆H₅ refer to ethyl and phenyl respectively.

The invention has been described in detail with particular reference to preferred embodiments thereof, but, it will be understood that variations and modifications can be effected within the spirit and scope of the invention.

I claim:

1. A merocyanine filter dye selected from those having the formula

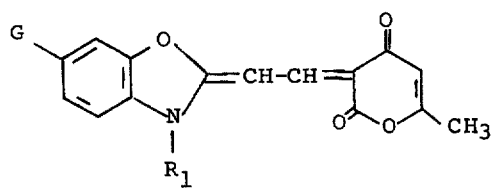

wherein $R_1$ represents a lower alkyl, phenyl, methylphenyl, chlorophenyl, cyanoalkyl, or acylalkyl group 5. The merocarbocyanine filter dye 6-methyl-3-[(3-phenacyl-2-benzoxazolinylidene)ethylidene]-2H-pyran-2,4-(3H)-dione.

6. The merocarbocyanine filter dye 3-[(6-acetylsulfamoyl-3-methyl-2-benzoxazolinylidene)ethylidene]-6-methyl-2H-pyran-2,4(3H)-dione.

7. The merocarbocyanine filter dye 3[(6-N-phenylsulfamoyl-3-methyl-2-benzoxazolinylidene)ethylidene]-2H-pyran-2,4(3H)-dione.

8. The merocarbocyanine filter dye 3-[(6-N-ethylsulfamoyl-3-methyl-2-benzoxazolinylidene)ethylidene]-6-methyl-2H-pyran-2,4(3H)-dione.

9. A mercocyanine filter dye as defined in claim 1 wherein G represents a group having the formula
R₂CONHSO₂—
or
R₃NHSO₂—
wherein $R_2$ and $R_3$ each represent a lower alkyl, phenyl, methylphenyl, or chlorophenyl group.

10. A merocyanine filter dye as defined in claim 1 wherein G represents an acetylsulfamoyl, phenylsulfamoyl, or ethylsulfamoyl group.

* * * * *